Oct. 26, 1943.  D. N. MUSSEN ET AL  2,332,660
WIPER ARM
Filed Aug. 14, 1941
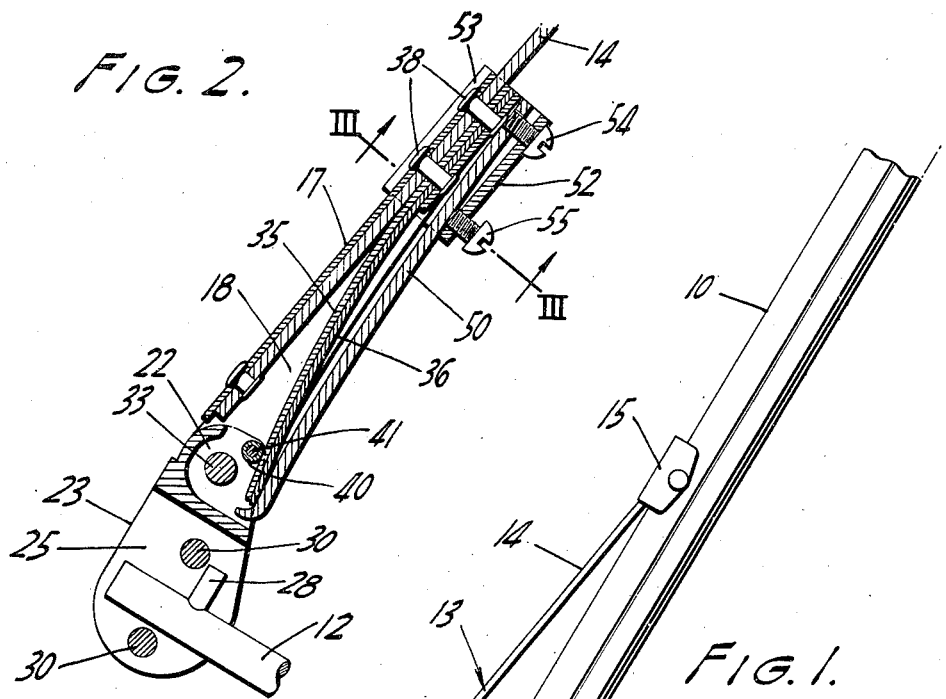
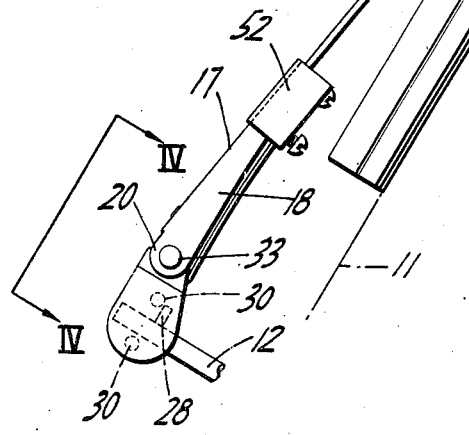
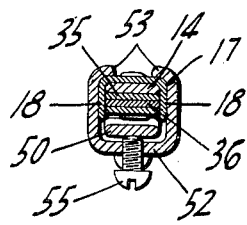
DONALD N. MUSSEN
& EARL V. SCHAAL.
INVENTORS
BY
Bean, Brooks, Buckley & Bean.
ATTORNEYS Patented Oct. 26, 1943

2,332,660

UNITED STATES PATENT OFFICE 2,332,660

WIPER ARM

Donald N. Mussen, Williamsville, and Earl V. Schaal, East Aurora, N. Y., assignors to Trico Products Corporation, Buffalo, N. Y.

Application August 14, 1941, Serial No. 406,770

8 Claims. (Cl. 15—255)

This invention relates to windshield cleaners and particularly to an improved wiper carrying arm for such cleaners.

Generally speaking, windshield wiper arms embody or are provided with resilient means for causing the wiper carrying arm to urge the wiper blade carried thereby toward the windshield being acted upon. According to principles of the present invention, improved means are provided for applying a resilient force for this purpose. A further object of the present invention resides in the provision of means for readily adjusting or varying the resilient pressure applied to the wiper blade. A further object of the present invention resides in the provision of auxiliary means which may readily be applied to conventional wiper installations for the application of supplementary resilient wiping pressure, such auxiliary means incorporating means for selectively adjusting the resilient urge against the wiping blade.

The illustrated form of the invention, which is shown merely by way of example, depicts a wiper arm of the type generally associated with a rock shaft for supporting an oscillatable wiping blade. Obviously, the principles of the present invention may be applied with equal facility to wiper supporting arms adapted to be associated with reciprocating wipers or wipers arranged for movement on a windshield surface in any other manner. While a single complete embodiment of the present invention is disclosed in the drawing and described in detail in the ensuing description, the principles of the invention are not to be considered as limited thereto or otherwise than as defined in the appended claims.

In the drawing:

Fig. 1 is a general elevational view of a windshield wiper and a portion of the actuating rock shaft therefor with a wiper carrying arm constructed in accordance with the principles of the present invention connecting between the actuating rock shaft and the wiper blade;

Fig. 2 is a fragmentary, cross sectional view of a portion of the wiper blade supporting arm viewed as in Fig. 1 but on an enlarged scale;

Fig. 3 is a transverse, cross sectional view taken on the line III—III of Fig. 2; and, Fig. 4 is a fragmentary view taken as indicated by the line IV—IV of Fig. 1.

In the drawing like characters of reference denote like parts throughout the several figures and the numeral 10 designates a conventional windshield wiper blade operating upon a windshield surface indicated by the dot-and-dash line at 11 in Fig. 1. An actuating rock shaft is designated 12 and the novel wiper supporting arm connecting between the rock shaft 12 and the wiper blade 10 is designated generally 13 in Fig. 1.

The wiper arm 13 comprises a strip 14 which has one of its ends suitably connected with the wiper blade 10 substantially medially of the latter as at 15. This connection does not form a material part of the present invention and may be effected in any conventional manner. The opposite end of the strip 14 is secured against the inner side of the web of a channel-shaped member 17. The flanges 18 of the channel-shaped member 17 are extended in a direction away from the strip 14 to provide spaced coaxial bearing portions 20. The bearing portions 20 are adapted to be disposed over a second pair of bearing portions 22 which are coaxial therewith and formed upon a rock shaft connecting element 23.

The rock shaft connecting element 23 is preferably secured rigidly to the rock shaft 12 and such securement may be accomplished by providing half round depressions in a surface 25 of the element 23 and also in a surface of a cooperating clamping or cap element 26. To prevent axial removal of the shaft 12 from between the elements 23 and 26, a lateral extension 28 may be formed rigidly with the rock shaft 12 and likewise received in complementary depressions in the meeting faces of the elements 23 and 26. The connecting element 23 and the clamping or cap member 26 may be held to rigidly embrace the end of the rock shaft 12 by a pair of screws 30 or in any other convenient manner.

A pin 33 extends through the aligned coaxial pairs of bearings 20 and 22 and provides a pivoted joint between the rock shaft connecting element 23 and the rigidly assembled channel-shaped member 17 and strip 14. It is desired to impart to the assembled channel 17 and strip 14 a resilient rotative urge which is clockwise as viewed in Figs. 1 and 2. To this end it has heretofore been proposed to provide a leaf spring comprising a pair of laminations 35 and 36 having an end thereof rigidly secured to the strip 14 and the channel 17 in cantilever fashion as by means of a pair of rivets 38.

The outer free ends of the laminations 35 and 36 bear against an anti-friction roller 40 carried by a pin 41 which is supported between the bearing portions 22 of the rock shaft connecting element 23. The pin 41 and the roller 40 carried thereby are disposed eccentrically with respect to the pivot pin 33 and it will be noted that the urge of the spring laminations 35 and 36 imparts a force to the roller 40 tending to rotate the connecting element 23 in a counter-clockwise direction with respect to the pivot pin 33. The connecting element 23 is, of course, rigidly secured to the rock shaft 12 and the reaction to this resilient urge accordingly urges the wiper supporting arm 13 in a clockwise direction as viewed in the drawing and presses the wiper blade 10 into contact with the windshield surface 11 as desired.

The improvement of the present invention resides in the provision of means for augmenting the spring urge thus far defined and for augmenting the resilient pressure in selectively adjustable manner. The means chosen for producing this auxiliary adjustable wiper arm pressure is preferably arranged to be conveniently associated with conventional windshield wiper arms of the type thus far set forth. In a preferred form an auxiliary spring leaf 50 is provided. The means for adjustably supporting the spring leaf 50 comprises a channel-shaped clamping member 52 which has inturned flanges 53 at the terminal edges of its side flanges, whereby the member 52 may be disposed over the assembled channel 17, strip 14 and spring laminations 35 and 36.

As appears clearly from Fig. 2, the clamping element 52 is preferably disposed adjacent the end of the channel 17 which is remote from its pivotal connectiong with the rock shaft connecting member 23. For retaining the member 52 in this desired position a screw 54 is threaded into the web thereof and screwed tightly against the assembled channel 17, strip 14 and spring laminations 35 and 36. As shown in Fig. 2, the end of the screw 54 bears against the head of one of the rivets 38 and, as a result of this cooperation, the inner sides of the inturned flanges 53 of the clamping element 52 are brought into frictionally locking engagement with the outer surface of the web of the channel member 17.

A clearance hole is formed in the end of the spring leaf 50 adjacent the clamping element 52 and the body of the screw 54 passes therethrough in reaching its clamping position to incidentally retain the leaf spring 50 against axial removal from within the channel-shaped clamping element 52. Another screw 55 is threaded into the web of the locking element 52 and acts directly against the adjacent surface of the spring leaf 50 and urges the outer free end of the latter directly against the primary spring laminations 35 and 36 to add to the previously described resilient urge thereof.

Patently, the auxiliary resilient urge of the leaf spring 50 may be increased or relaxed by adjustment of the position of the screw 55 in the web of the channel-shaped locking element 52. As illustrated in Fig. 2 of the drawing, a minimum of auxiliary spring pressure is imparted by the leaf spring 50 since the outer surface thereof is resting against the inner surface of the web of the channel clamping element 52. Increasing the auxiliary resilient urge of the leaf spring 50 by adjustment of the screw 55 will bow the leaf spring 50 and remove it from direct engagement with the web of the channel-shaped locking element 52. Removal of the screw 54 from its assembled position permits the clamping element 52 to be moved out of assembled position (generally upwardly along the strip 14 as viewed in the drawing), and the leaf spring 50 will merely fall away from the spring laminations 35 and 36.

What is claimed is:

1. A wiper arm comprising an inner section adapted to be fixed to an actuator and having a pivot and an adjacent abutment, and an outer wiper engaging section comprising a channeled member engaging the pivot and a leaf spring secured in said channel and having a free end directed toward said inner section and disposed resiliently against said abutment, auxiliary tensioning means comprising means attachable to said channel member and an auxiliary leaf spring carried by said attachable means and having a free end bearing resiliently against the first leaf spring to increase the force thereof against said abutment, said auxiliary spring bearing against the first leaf spring beyond the abutment whereby the latter serves as a fulcrum for the first leaf spring, and means carried by said attachable means for varying the resilient urge of said auxiliary leaf spring against the first leaf spring.

2. A wiper arm comprising an inner section adapted to be fixed to an actuator and an outer wiper engaging section, one of said sections having a pivot and an adjacent abutment and the other of said sections comprising a channeled member engaging the pivot and a leaf spring secured in said channel and having a free end directed toward the one section and disposed resiliently against said abutment, auxiliary tensioning means comprising means attachable to said channel member and an auxiliary leaf spring carried by said attachable means and having a free end bearing resiliently against the first leaf spring to increase the force thereof against said abutment, and means carried by said attachable means for varying the resilient urge of said auxiliary leaf spring against the first leaf spring.

3. A wiper arm comprising an inner section adapted to be fixed to an actuator and having a pivot and an adjacent abutment, an outer wiper engaging section engaging the pivot and a leaf spring secured thereto and having a free end directed toward said inner section and disposed resiliently against said abutment, auxiliary tensioning means comprising means attachable to said outer section and an auxiliary leaf spring carried by said attachable means and having a free end bearing resiliently against the first leaf spring to increase the force thereof against said abutment, and means carried by said attachable means for varying the resilient urge of said auxiliary leaf spring against the first leaf spring.

4. A wiper arm comprising an inner section adapted to be fixed to an actuator and having a pivot and an adjacent abutment, an outer wiper engaging section engaging the pivot and a leaf spring secured thereto and having a free end directed toward said inner section and disposed resiliently against said abutment, auxiliary tensioning means comprising sleeve means disposable about said wiper engaging section, readily releasable means for securing said sleeve means upon said wiper engaging section, an auxiliary leaf spring retained by said sleeve means and having a free end bearing resiliently against the first leaf spring to increase the force thereof against said abutment, and means carried by said sleeve means for varying the resilient urge of said auxiliary leaf spring against the first leaf spring.

5. For use with a wiper arm comprising pivoted sections, an abutment on one section and a leaf spring carried by the other section, and having a free end bearing resiliently against said abutment; auxiliary tensioning means comprising a sleeve disposable about said other section, an auxiliary leaf spring having an end thereof within said sleeve and its opposite end disposed to bear against a free portion of the first leaf spring to increase the resilient force thereof against said abutment, a clamping screw threaded into said sleeve and extending loosely through an opening in the auxiliary leaf spring and against said other section to retain the auxiliary leaf spring and clamp the sleeve about said other section, a second screw threaded into said sleeve and engaging the auxiliary leaf spring to selectively vary the resilient urge thereof against the first leaf spring.

6. In a window cleaner, a wiper carrying arm comprising mounting means and wiper engaging means, said wiper engaging means comprising an elongate element having a channel shaped portion adjacent one end thereof and wiper attaching means at its opposite end, means pivotally attaching the one end of said wiper engaging means to said mounting means, an abutment carried by said mounting means and a leaf spring secured within the channel portion of said wiper engaging means and having a projecting portion for engagement against said abutment to urge the wiper attaching means of said wiper engaging means toward a window being acted upon, other resilient means acting against said leaf spring beyond said abutment to augment its resilient urge by tending to flex the leaf spring about said abutment as a fulcrum, and means for adjusting the tension of said other resilient means.

7. For use with a wiper arm comprising pivoted sections, an abutment on one section and a flat spring carried by the other section and having a free end bearing resiliently against said abutment; auxiliary tensioning means comprising a saddle securable to said other section, an auxiliary flat spring having an end thereof securable to said saddle against endwise displacement and its opposite end disposed to bear against a free portion of the first flat spring to increase the resilient force thereof against said abutment, and a screw threaded into said saddle and engaging the auxiliary flat spring to selectively vary the resilient urge thereof against the first flat spring.

8. A wiper arm comprising an inner section adapted to be fixed to an actuator and an outer wiper engaging section pivoted to the inner section, an abutment on one end of said sections and flat spring means secured to the other section and having a free end directed to the section having the abutment, said free end being disposed resiliently against said abutment, auxiliary tensioning means comprising a second flat spring attachable to the spring carrying section and having a free end bearing resiliently against the first flat spring to increase the force thereof against said abutment, and means carried by said attachable means for varying the resilient urge of said second spring against the first spring.

DONALD N. MUSSEN.
EARL V. SCHAAL.